N. KAPLAN.
FIRE ESCAPE.
APPLICATION FILED FEB. 23, 1916.
1,241,856.
Patented Oct. 2, 1917.
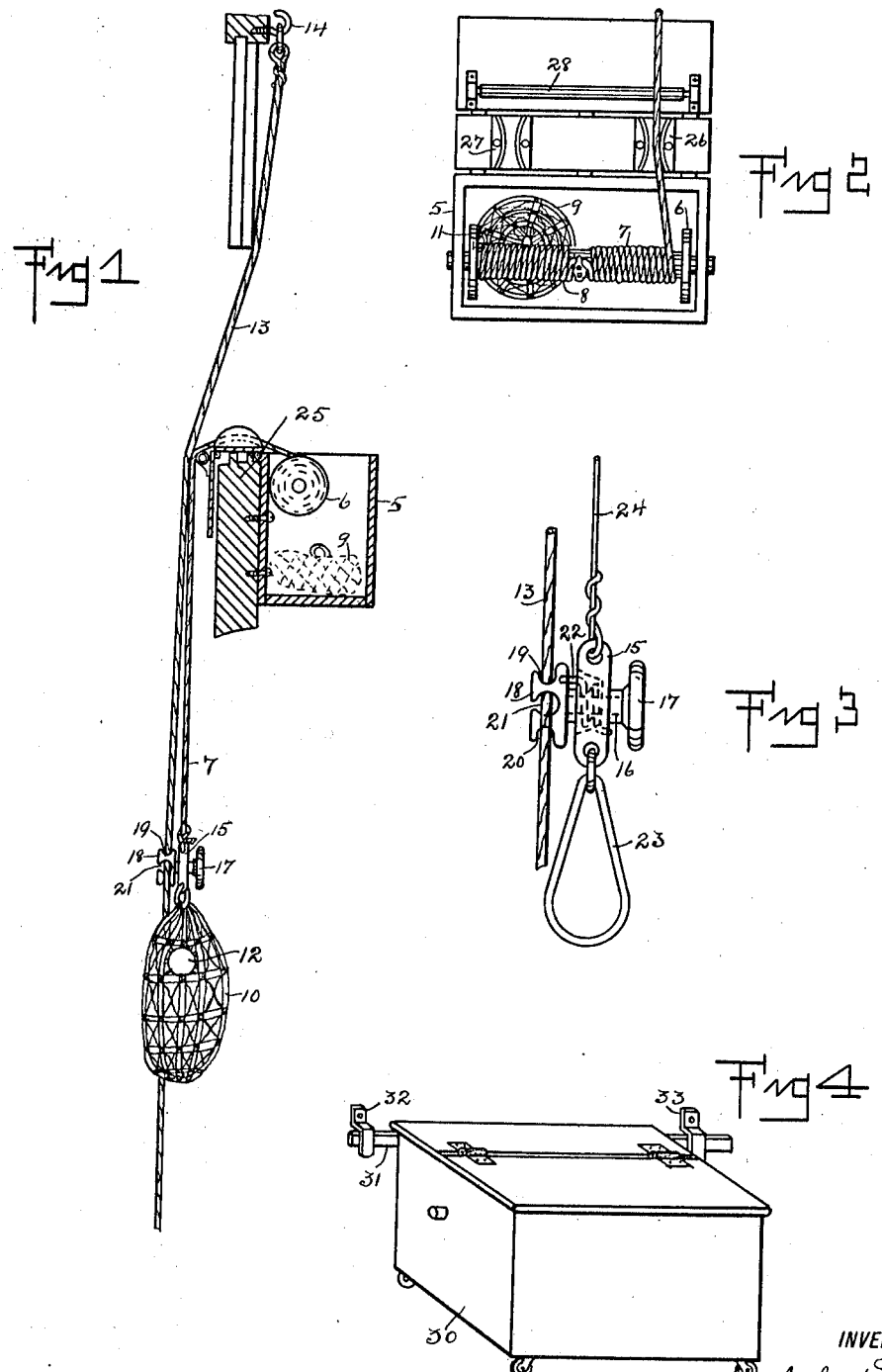

UNITED STATES PATENT OFFICE.

NATHAN KAPLAN, OF NEW YORK, N. Y.

FIRE-ESCAPE.

1,241,856.   Specification of Letters Patent.   Patented Oct. 2, 1917.

Application filed February 23, 1916.   Serial No. 79,854.

*To all whom it may concern:*

Be it known that I, NATHAN KAPLAN, a citizen of the United States, and resident of the borough of Manhattan, city, county, and State of New York, have invented certain new and useful Improvements in Fire-Escapes, of which the following is a specification.

This invention is one wherein a rope is used and I provide means for supporting a body and means for lowering a body without serious inconvenience.

I also provide means for storing the entire apparatus in a position where it will be ready for immediate use.

As I am aware that devices of this kind should be operable even by the uninitiated I have endeavored to construct my device in the simplest and yet most efficient manner.

In the drawings, which illustrates the preferred form of my invention, Figure 1 is a side view of the device, in operative position, the container and parts of the building being shown in cross section;

Fig. 2 is a plan view of the device.

Fig. 3 is an enlarged detail view of the friction controlling means.

Fig. 4 a perspective view of the container or cabinet in which my device is inclosed.

In its most complete form my invention consists of a cabinet 5, wherein is arranged a rotatable spool or reel 6, upon which will be wound two lengths of rope 7 and 8. The rope may be continuous but when it is placed upon the spool 6, the ends are wound in the reverse direction so that the unwinding of one end of the rope will wind the other end upon the spool or reel.

Within the cabinet 5, I may place two baskets or body nets 9 and 10. These nets may be made of rope or other material that will allow them to fold and to occupy but little space. The end of the rope 7, may be secured through a suitable medium to the net 10, but during the first portion of the operation the end of the rope 8, should be engaged upon a hook 11, so that the reel or spool 6, may turn freely. When the net 10, is fully lowered, the net 9, may be hooked to the end of the rope 8, and may in turn be lowered which action will reel up the rope 7, withdrawing the net 10 to a position adjacent to the window.

It is my intention that each of these nets shall be of a size sufficient to completely inclose the body of the user and that armholes 12, will be provided so that the arms may be projected to operate a device to be later described.

I also provide a length of rope as indicated at 13, which may be termed a "guide" rope and which may be temporarily or permanently secured to a hook 14, which is attached at some convenient point adjacent to the window or other exit.

Secured to the end of each of the ropes 7, and 8 is a block 15, and through this block I arrange a shaft 16, which is rotatable by means of a hand-wheel 17. Upon the shaft 16, I secure a friction clamp 18 and it will be noted that this clamp consists of two projections having rope guiding grooves 19 and 20, and that between the projections I provide a nearly annular space 21.

When the device is to be used the guide rope is engaged into the space 20, and then a slight turn of the clamp 18, will cause its projections to frictionally engage the guide rope, thus preventing a rapid descent of the net.

As two nets are used with a single guide rope, it will be desirable that the clamp be readily disengaged from the guide rope when a net is descended to its full extent. This may be accomplished by having the guide rope shorter than the rope which lowers the net by having it suspended 6 or 7 feet from the ground. I have, however, provided an open passage for the rope into the clamp 18, and when the net is empty it will swing away from the guide rope and will thus free the clamp from engagement therewith.

As it is desirable that the device be simple in its operation, I have provided a spring 22, within the block 15, one end of which engages the clamp 18. This spring will tend to retain the clamp not in the operative position shown, but at right angles thereto, so that a rope may be engaged therewith without difficulty.

I may depend upon the ropes coiled upon the drum for supporting the nets, but I may dispense with the nets and provide a belt 23.

I may also support the blocks 15, on a light rope 24, depending upon the frictional engagement between the clamp 18, and the rope 13, to support the weight of the person being lowered.

When the cover of the cabinet is opened it should project across the window sill indicated at 25, and suspend exterior to the window. Upon the cover I have arranged anti-friction ways 26 and 27, for each of the ropes 7 and 8, and upon the second portion of the cover, the portion which will suspend outside of the window, I provide a roller 28, which will effectively prevent chaffing of the rope during its several movements.

In Fig. 1, I have indicated that the cabinet may be secured adjacent to a window but in Fig. 4, I show a cabinet 30, which may be movable and which is secured in position by means of a bar 31, which is fastened to the cabinet and which engages suitably arranged cleats 32 and 33.

It will of course be understood that parts of my device may be used without the whole and that I may use the simple construction shown in Fig. 3, without the cabinet or the nets or the winding spool 6.

Other modifications may be made within the scope of the appending claims without departing from the principle or sacrificing the advantages of this invention.

What I claim and desire to secure by Letters Patent is:

The combination in a fire escape having a plurality of suspended ropes and a body supporting means, of a friction device for controlling the descent of said body supporting means, comprising a block secured between one said rope and said body supporting means, a shaft extending through said block, a hand wheel on one end of said shaft for partially rotating said shaft, a spring secured to said block and to said shaft for returning said shaft after each partial revolution, and a friction device upon said shaft having a plurality of projections spaced apart with an opening between them, said friction device being adapted to frictionally engage another rope by partial revolution of said hand wheel, and to automatically be disengaged therefrom by the return of said shaft by said spring as and for the purpose set forth.

Signed N. Y. City, county N. Y. and State N. Y., this 15th day of Feb., 1916.

NATHAN KAPLAN.

Copies of this patent may be obtained for five cents each, by addressing the "Commissioner of Patents, Washington, D. C."